J. R. HILL.
AUTOMATIC DIRIGIBLE LAMP FOR AUTOMOBILES.
APPLICATION FILED MAY 15, 1915.
1,172,023. Patented Feb. 15, 1916.
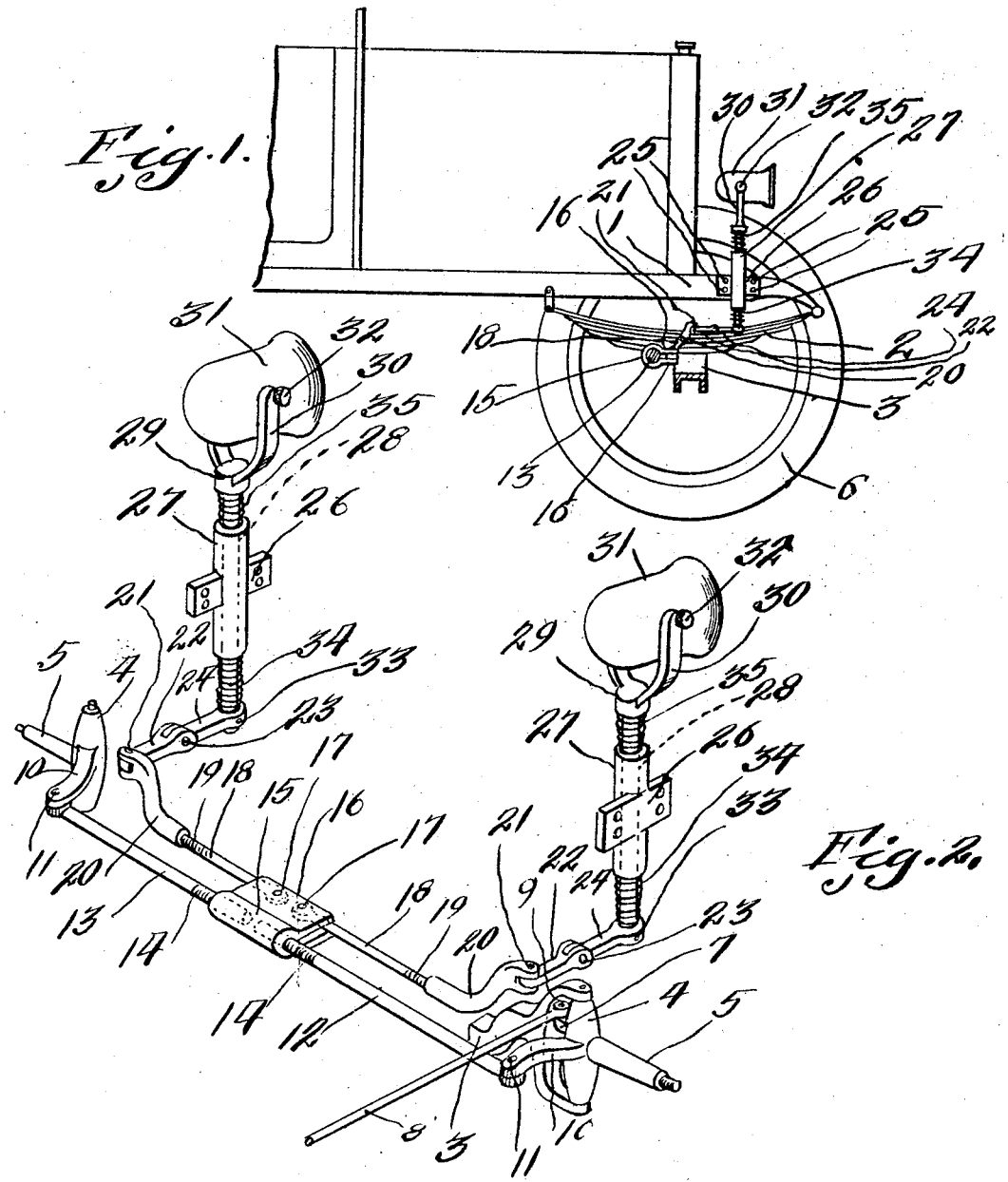

UNITED STATES PATENT OFFICE.

JOHN R. HILL, OF KNOXVILLE, TENNESSEE.

AUTOMATIC DIRIGIBLE LAMP FOR AUTOMOBILES.

1,172,023.  Specification of Letters Patent.  Patented Feb. 15, 1916.

Application filed May 15, 1915. Serial No. 28,327.

*To all whom it may concern:*

Be it known that I, JOHN R. HILL, a citizen of the United States, residing at Knoxville, in the county of Knox and State of Tennessee, have invented a new and useful Automatic Dirigible Lamp for Automobiles; and I do hereby declare the following to be a full, clear, and exact description of the invention, such as will enable others skilled in the art to which it appertains to make and use the same.

This invention relates to the art of illumination for automobiles, and particularly to an improved automatic dirigible lamp mechanism, and an object of the invention is to provide a mechanism of this design, whereby as the front wheels of the automobile are moved in one direction or the other in turning to the right or left, the lamps are correspondingly thrown or moved.

Another object of the invention is to provide means to avoid undue vibration of the lamp vertically, incident to the vertical vibration of the body of the automobile, and incident to the vertical vibration of the front wheels, in traveling over rough roads.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation and partly in section of a portion of an automobile, showing the improved dirigible lamp mechanism as applied thereto. Fig. 2 is an enlarged detail perspective view of the mechanism detached.

Referring more especially to the drawings, 1 designates the frame of the machine, mounted upon suitable springs 2, and 3 denotes the front axle of the automobile, to which the knuckles 4 (which are provided with the usual stub axles 5 for the front wheels 6) are pivotally connected in the usual manner. One of the knuckles 4 is provided with a lateral arm 7, to which a rod 8 is pivoted, as at 9. This rod 8 may be connected to the conventional form of steering mechanism (not shown), in order to operate one of the knuckles which in turn oscillates one of the front wheels. Both of the knuckles are provided with arms 10 extending substantially at right angles from the knuckles, as shown. Pivoted at 11 to the arms 10 are the rods 12 and 13, the adjacent end portions of which are threaded as at 14, and connecting the adjacent threaded ends of said rods 12 and 13 is a sleeved plate 15 having the ears 16. The threads 14 of the adjacent ends of the rods 12 and 13 are right and left threads, and by turning the sleeved plate in one direction or the other, the rods 12 and 13 may be adjusted relative to each other, whereby the proper position of the knuckles may be attained, so that the front wheels of the automobile may be adjusted relative to each other in parallelism, that is, in plan view. Pivoted at 17 between the ears 16 of said sleeved plate are the adjacent ends of the rods 18. The outer ends of the rods 18 are threaded at 19, and to the threaded ends 19 the compound curved links 20 are connected, which in turn are pivoted at 21 to the links 22, and these links 22 are in turn pivoted at 23 to the arms 24.

Secured at 25 to the frame 1 of the automobile are plates 26, which form integral parts of the sleeved bearings 27, in which the vertical rods 28 are mounted. The upper ends of the rods 28 terminate in the usual heads 29 having forks 30, in which the usual lamps 31 are pivotally mounted as at 32. The arms 24 are secured by the pins 33 to the lower ends of the rods 28. Interposed between the lower ends of the sleeved bearings 27 and the arms 24 are springs 34, and between the heads 29 and the upper ends of the sleeved bearings springs 35 are arranged. It is to be observed that the pivots 23 between the links 22 and the arms 24, permit the links 22 to oscillate vertically, but not laterally relative to the arms 24, therefore, by this construction the vertical vibration of the wheels, incident to passing over rough roads will not affect the lamps to any perceptible degree. Furthermore, it will be observed that by the provision of the springs 34 and 35, above and below the sleeved bearings 27 are of equal tension, and act to yieldably support the lamp, and owing to said springs, the vertical vibration of the body of the automobile (to the frame of which body the sleeved bearings 27 are connected) will not affect the lamps to any noticeable degree.

By the provision of the automatic dirigible lamp mechanism shown and described, it is to be observed that as one knuckle is oscillated horizontally by the steering mechanism (not shown), both knuckles will correspondingly move, therefore the front wheels will be turned to the right or the left, and incident to the wheels moving or oscillating in this regard, the lamps of the automobile will correspondingly oscillate, owing to the connections between the lamp and the rods 12 and 13, as shown particularly in Fig. 2 of the drawings.

The invention having been set forth, what is claimed as new and useful is:—

In combination with an automobile frame, a pair of sleeved bearings fixed to correspondingly opposite sides of the frame, rods yieldably mounted in said sleeved bearings to have slight vertical movements and having lamps at their upper ends, arms extending laterally from the lower ends of said rod and rearwardly, one arm being in parallelism to the opposite arm, links horizontally pivotally connected to the rear ends of the arms to oscillate vertically, transversely disposed substantially alined links having their outer ends provided with vertical pivotal connections with the rear ends of the first links so as to oscillate horizontally, a connection between the opposite front wheels including a plate having vertical pivotal connections with the adjacent ends of the second alined links, so that the second links will oscillate horizontally relative to the plate, whereby as the front wheels are turned, the lamps will correspondingly move.

In testimony whereof I have signed my name to this specification in the presence of two subscribing witnesses.

JOHN R. HILL.

Witnesses:
H. A. IJAMS,
M. C. NIXON.